(12) United States Patent
Sun et al.

(10) Patent No.: US 9,985,273 B2
(45) Date of Patent: May 29, 2018

(54) THREE-DIMENSIONAL NANOSIZED POROUS METAL OXIDE ELECTRODE MATERIAL OF LITHIUM ION BATTERY AND PREPARATION METHOD THEREOF

(75) Inventors: Jiangming Sun, Shanghai (CN); Tiepeng Zhao, Shanghai (CN); Zhigang Xu, Shanghai (CN); Yanbing Wang, Shanghai (CN); Gang Wang, Shanghai (CN); Ming Zhang, Shanghai (CN); Shirong Xie, Shanghai (CN)

(73) Assignee: SHANGHAI ZHONGKE SHENJIANG ELECTRIC VEHICLE CO., LTD, Shanghai (CN)

( * ) Notice: Subject to any disclaimer, the term of this patent is extended or adjusted under 35 U.S.C. 154(b) by 528 days.

(21) Appl. No.: 13/816,710

(22) PCT Filed: Jun. 27, 2011

(86) PCT No.: PCT/CN2011/076415
§ 371 (c)(1),
(2), (4) Date: Feb. 12, 2013

(87) PCT Pub. No.: WO2012/019492
PCT Pub. Date: Feb. 16, 2012

(65) Prior Publication Data
US 2013/0143115 A1 Jun. 6, 2013

(30) Foreign Application Priority Data
Aug. 13, 2010 (CN) .......................... 2010 1 0253084

(51) Int. Cl.
*H01M 4/04* (2006.01)
*H01M 4/131* (2010.01)
(Continued)

(52) U.S. Cl.
CPC ........... *H01M 4/04* (2013.01); *H01M 4/0471* (2013.01); *H01M 4/0497* (2013.01);
(Continued)

(58) Field of Classification Search
CPC .... H01M 4/0471; H01M 4/36; H01M 4/0497; H01M 4/1391; H01M 4/131; H01M 2004/021; H01M 4/04
(Continued)

(56) References Cited

U.S. PATENT DOCUMENTS

| 6,680,013 B1 * | 1/2004 | Stein ..................... B29C 67/202 |
| | | 264/44 |
| 2003/0054149 A1 * | 3/2003 | Pan .......................... 428/292.1 |
| 2011/0206990 A1 * | 8/2011 | Akagi et al. ............... 429/231.1 |

FOREIGN PATENT DOCUMENTS

| CN | 1901256 | 1/2007 |
| CN | 101567440 | 10/2009 |

(Continued)

OTHER PUBLICATIONS

Li et al. "High capacity three-dimensional ordered macroporous CoFe2O4 as anode material for lithium ion batteries." Electrochimica Acta 55 (2010) 4594-4598, available Mar. 2010.*

(Continued)

*Primary Examiner* — Milton I Cano
*Assistant Examiner* — Michael Dignan
(74) *Attorney, Agent, or Firm* — Avery N. Goldstein; Blue Filament Law PLLC

(57) ABSTRACT

A preparation method of a three-dimensional nanosized porous metal oxide electrode material of lithium ion battery, which soaks a dried polymer colloidal crystal microsphere template in a metal salt solution as a precursor solution for a period of time, and obtains a precursor template complex after filtration and drying; heats the precursor template
(Continued)

polystyrene template

Soaked in a precursor precursor template complex

Incinerated to remove the template three-dimensional nanosized porous microparticle complex to a certain temperature at a low heating rate and keeps the temperature, and then obtains the three-dimensional nanosized porous metal oxide electrode material of lithium ion battery after cooling to room temperature. A metal oxide electrode material is manufactured, with the three-dimensional nanosized porous metal oxide electrode material thereby improving the ionic conductivity of the negative electrode material of lithium ion battery, and shortens the diffusion path of the lithium ions during an electrochemical reaction process, and improves the rate discharge performance of lithium ion battery greatly.

3 Claims, 4 Drawing Sheets

(51) Int. Cl.
H01M 4/1391 (2010.01)
H01M 4/02 (2006.01)
(52) U.S. Cl.
CPC ......... *H01M 4/131* (2013.01); *H01M 4/1391* (2013.01); *H01M 2004/021* (2013.01)

(58) Field of Classification Search
USPC .................................................. 429/209, 405
See application file for complete search history.

(56) References Cited

FOREIGN PATENT DOCUMENTS

| CN | 101937989 | | 1/2011 |
| WO | 2008151163 | | 12/2008 |
| WO | WO-2010050347 | * | 6/2010 |

OTHER PUBLICATIONS

Sadakane et al. "Preparation of three dimensionally ordered macroporous perovskite-type lanthanum—iron-oxide LaFeO3 with tunable porediameters: High porosity and photonic property" Journal of Solid State Chemistry 183 (2010) 1365-1371, available Apr. 2010.*

Guo et al. "Preparation of α-Fe2O3 submicro-flowers by a hydrothermal approach and their electrochemical performance in lithium-ion batteries." Electrochimica Acta 53 (2008) 4213-4218, available Jan. 2008.*

* cited by examiner

THREE-DIMENSIONAL NANOSIZED POROUS METAL OXIDE ELECTRODE MATERIAL OF LITHIUM ION BATTERY AND PREPARATION METHOD THEREOF

FIELD OF TECHNOLOGY

The present invention relates to the technical field of electrode materials, especially to the technical field of electrode materials of lithium ion battery, in particular to a three-dimensional nanosized porous metal oxide electrode material of lithium ion battery and preparation method thereof.

DESCRIPTION OF RELATED ARTS

Through the analysis of the development status of lithium ion battery, it can be known that the lithium ion battery market and application field will expand rapidly and continuously in the next few years. In the aspect of the negative electrode materials of lithium ion battery, graphite-like carbon material will be still the negative electrode material of lithium-ion battery mainly used in the next period of time, due to its good cycling stability, ideal charging and discharging platform and higher cost performance at present. However, the charge and discharge specific capacity of the carbon material is relatively low, the volumetric capacity further has no advantages, then it is hard to meet battery high capacity required by electric vehicles and hybrid electric vehicles. Therefore, it is very urgent to develop a new negative electrode material of lithium ion battery with high specific capacity, high charge-discharge efficiency and long cycle life.

Metal oxide electrode material becomes one of the research hotspots in recent years, for it has the characteristics of cheapness, abundant raw materials, pollution-free to the environment, high theoretical capacity and so on. And the structure, morphology and nanocrystallization of one material have important effects on its electrochemical property. The special porous micro morphology and relatively large specific surface area of a three-dimensional porous nanomaterial provide the lithium ions with more active sites; thin hole walls effectively reduce the diffusion path of the lithium ions; high porosity makes an electrolyte to be immersed effectively, thereby improving the ionic conductivity of the material. Therefore, the preparation of a three-dimensional porous nanosized oxide electrode material with large specific surface area, high porosity, good electrochemical property has a great realistic significance.

SUMMARY OF THE INVENTION

Aspects of the present invention generally pertain to a three-dimensional nanosized porous metal oxide electrode material of lithium ion battery and preparation method thereof, the three-dimensional nanosized porous metal oxide electrode material of lithium ion battery improves the ionic conductivity of the negative electrode material of lithium ion battery, and shortens the diffusion path of the lithium ions during an electrochemical reaction process, improves the rate discharge performance of lithium ion battery greatly, and its preparation method is designed uniquely, operated simply and conveniently, and suitable for large-scale popularization.

In order to realize the above aims, in a first aspect of the present invention, a preparation method of a three-dimensional nanosized porous metal oxide electrode material of lithium ion battery is provided, and comprises the following steps:

(1) soaking a dried polymer colloidal crystal microsphere template in a metal salt solution as a precursor solution for a period of time, and obtaining a precursor template complex after filtration and drying;

(2) heating the precursor template complex to a certain temperature at a low heating rate and keeping the temperature, and then obtaining the three-dimensional nanosized porous metal oxide electrode material of lithium ion battery after cooling to room temperature.

In a further aspect, the polymer colloidal crystal microsphere template is prepared by the following method: preparing a polymer microsphere emulsion with the polymer emulsion polymerization method, and then obtaining the polymer colloidal crystal microsphere template with regular arrangement by co-precipitation or centrifugation.

In yet another aspect, the polymer microsphere emulsion is a polystyrene microsphere emulsion.

In yet another aspect, the microsphere size of the polystyrene microsphere emulsion is 275±10 nm.

In a further aspect, the precursor solution is an ethylene glycol/methanol mixed solution of $Fe^{3+}$, a ethylene glycol/methanol mixed solution of $Fe^{3+}$ and $Co^{2+}$ or an ethanol solution of $SnCl_2 \cdot 2H_2O$.

In a further aspect, the period of time is 5~10 hours.

In a further aspect, the low heating rate is 1~5° C./min.

In a further aspect, the certain temperature is 450~600° C.

In a further aspect, the time for keeping the temperature is 10 hours.

In a second aspect of the present invention, a three-dimensional nanosized porous metal oxide electrode material of lithium ion battery is provided, and characterized in that, the three-dimensional nanosized porous metal oxide electrode material of lithium ion battery is prepared with any one of the above-mentioned preparation methods.

The beneficial effects of the present invention are as follows:

(1) The three-dimensional nanosized porous metal oxide electrode material of lithium ion battery of the present invention has a three-dimensional porous nanostructure, such a porous nanostructure improves the specific surface area and the ionic conductivity of the metal oxide electrode material greatly, and shortens the diffusion path of the lithium ions during an electrochemical reaction process, to make the electrode material react completely in the electrode reaction process, so as to further improve the specific capacity and the rate performance of the metal oxide electrode material, therefore the material is suitable for large-scale popularization.

(2) The preparation method of a three-dimensional nanosized porous metal oxide electrode material of lithium ion battery of the present invention just soaks a dried polymer colloidal crystal microsphere template in a metal salt solution as a precursor solution for a period of time, and obtains a precursor template complex after filtration and drying; incinerates the precursor template complex to a certain temperature at a low heating rate and keeps the temperature, and then obtains the three-dimensional nanosized porous metal oxide electrode material of lithium ion battery after cooling to room temperature, thus the preparation method is designed uniquely, operated simply and conveniently, and suitable for large-scale popularization.

BRIEF DESCRIPTION OF THE DRAWINGS

FIG. 3b is a cycle performance view of the three-dimensional nanosized porous metal oxide electrode material α-$Fe_2O_3$ of lithium ion battery shown in FIG. 3a.

FIG. 5b is a cycle performance view of the three-dimensional nanosized porous metal oxide electrode material $CoFe_2O_4$ of lithium ion battery shown in FIG. 5a.

FIG. 6b is a cycle performance view of the three-dimensional nanosized porous metal oxide electrode material $SnO_2$ of lithium ion battery shown in FIG. 6a.

DETAILED DESCRIPTION OF THE PREFERRED EMBODIMENT

In order to understand the technical content of the present invention clearly, the present invention is further exemplified by reference to the following examples. It is only intended to make the content of the present invention to be better understood, and not to limit the protection scope of the present invention.

Embodiment 1

Figure 1:
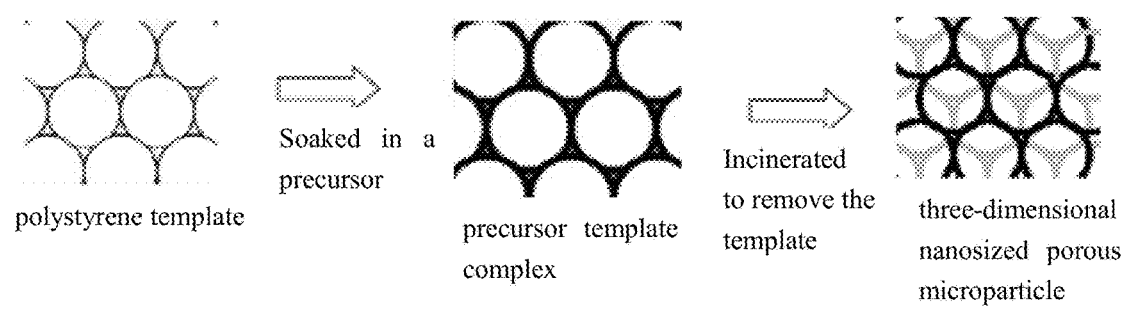
FIG. 1 is a schematic view of one embodiment of the preparation method of a three-dimensional nanosized porous metal oxide electrode material of lithium ion battery according to the present invention.
Figure 2:
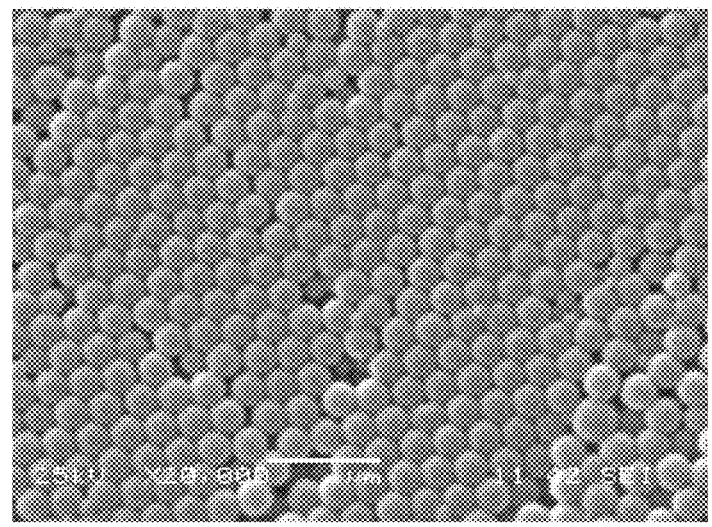
FIG. 2 is a scanning electron micrograph of the polystyrene colloidal crystal microsphere template with close arrangement obtained by the embodiment shown in FIG. 1 with the natural sedimentation method.

Preparation and Performance Test of a Three-Dimensional Nanosized Porous Metal Oxide Electrode Material α-$Fe_2O_3$ of Lithium Ion Battery (1) Preparation of a Polystyrene Colloidal Crystal Microsphere Template A 275±10 nm polystyrene microsphere emulsion is prepared by the emulsion polymerization method, the microspheres are arranged by the natural sedimentation method to be a polystyrene colloidal crystal microsphere template (as shown in FIG. 2), the scanning electron micrograph shows that the polystyrene colloidal crystal microsphere template presents a multilayer, orderly, regular, close arrangement in a large area, has fewer defects and a relatively strong sense of hierarchicy.

(2) Obtaining a Three-Dimensional Nanosized Porous Metal Oxide Electrode Material α-$Fe_2O_3$ The dried polystyrene colloidal crystal microsphere template is soaked in an ethylene glycol/methanol mixed solution of $Fe^{3+}$ as a precursor solution for 5 hours, a precursor template complex is obtained after filtration and drying; the precursor template complex is heated to 450° C. at 1° C./min and the temperature is kept for 10 hours, and then the three-dimensional nanosized porous metal oxide electrode material of lithium ion battery is obtained after cooling to room temperature.

Figure 3A:
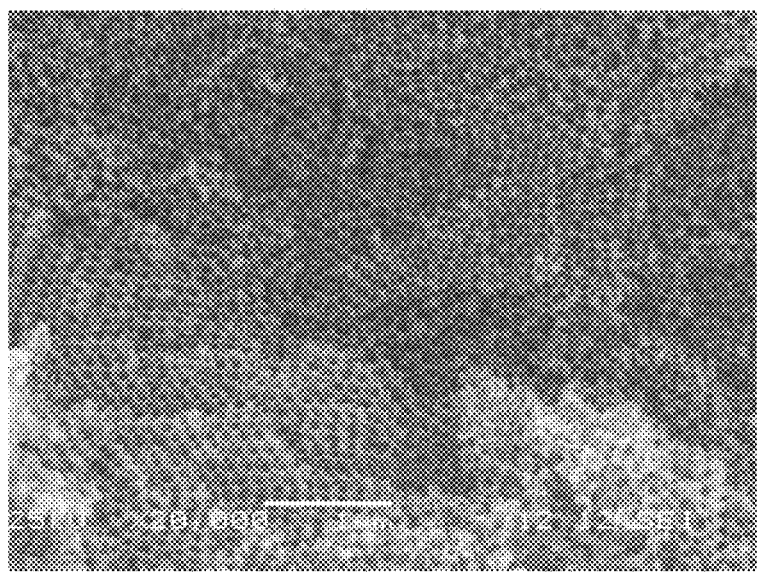
FIG. 3a is a scanning electron micrograph of the three-dimensional nanosized porous metal oxide electrode material α-$Fe_2O_3$ of lithium ion battery prepared with the polystyrene colloidal crystal microsphere template shown in FIG. 2.

The ethylene glycol/methanol mixed solution of $Fe^{3+}$ as a precursor solution is poured into the gaps of the above-mentioned polystyrene colloidal crystal microsphere template, the three-dimensional nanosized porous α-$Fe_2O_3$ is prepared after the incineration, which has a relative complete crystal form, and a three-dimensional porous network nanostructure (as shown in FIG. 3a), the diameter of a single aperture is approximately 115±10 nm; the aperture wall is composed of α-$Fe_2O_3$ crystal nanoparticles, and 20~30 nm in thickness.

Figure 3B:
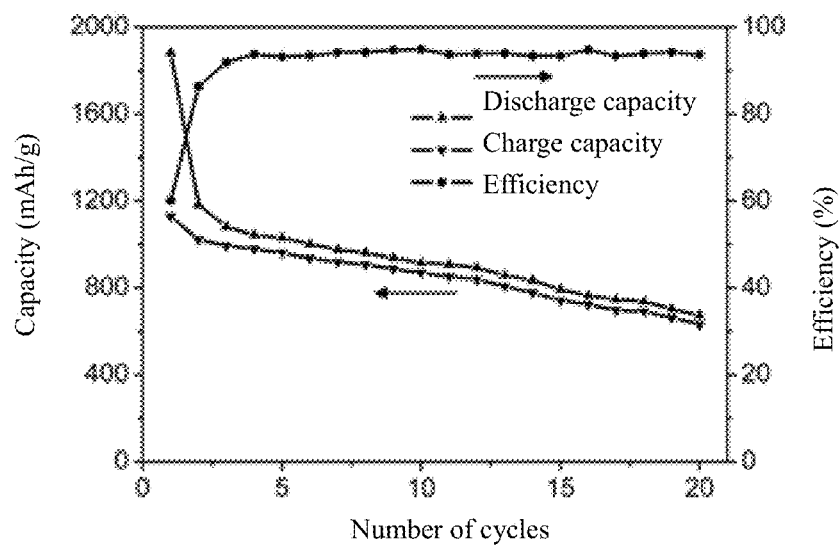

(3) Performance Test of a Three-Dimensional Nanosized Porous Metal Oxide Electrode Material α-$Fe_2O_3$ of Lithium Ion Battery The electrochemical tests show that the initial discharge and charge capacities reach 1880 and 1130 mAh·$g^{-1}$, respectively, after 20 cycles, the reversible capacity is still as high as 631 mAh·$g^{-1}$, and the coulombic efficiency remains above 90%, presenting a relatively high specific capacity and a good cycle performance (as shown in FIG. 3b).

Embodiment 2

Figure 4:
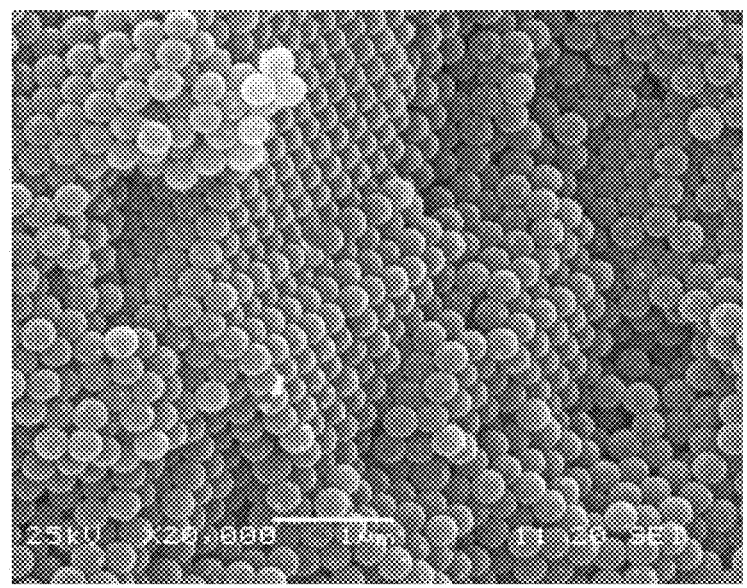
FIG. 4 is a scanning electron micrograph of the polystyrene colloidal crystal microsphere template with close arrangement obtained by the embodiment shown in FIG. 1 with the centrifugation method.

Preparation and Performance Test of a Three-Dimensional Nanosized Porous Metal Oxide Electrode Material $CoFe_2O_4$ of Lithium Ion Battery (1) Preparation of a Polystyrene Colloidal Crystal Microsphere Template A 275±10 nm polystyrene microsphere emulsion is prepared by the emulsion polymerization method, the microspheres are arranged by the centrifugation method to be a polystyrene colloidal crystal microsphere template (as shown in FIG. 4), the scanning electron micrograph shows that the polystyrene colloidal crystal microsphere template presents a multilayer, orderly, regular, close arrangement in a large area, has fewer defects and a relatively strong sense of hierarchicy.

(2) Obtaining a Three-Dimensional Nanosized Porous Metal Oxide Electrode Material $CoFe_2O_4$ An ethylene glycol/methanol mixed solution with a total metal ion concentration of 1.5 mol·L-1 (the molar ratio, $Fe^{3+}$:$Co^{2+}$=2:1) is prepared as a precursor solution. The dried PS colloidal crystal template is soaked in the precursor solution for 7 hours, a complex of the precursor and the template is obtained after vacuum filtration; the precursor template complex is heated to 550° C. at 3° C./min and the temperature is kept for 10 hours, and then the three-dimensional nanosized porous metal oxide electrode material of lithium ion battery is obtained after cooling to room temperature.

Figure 5A:
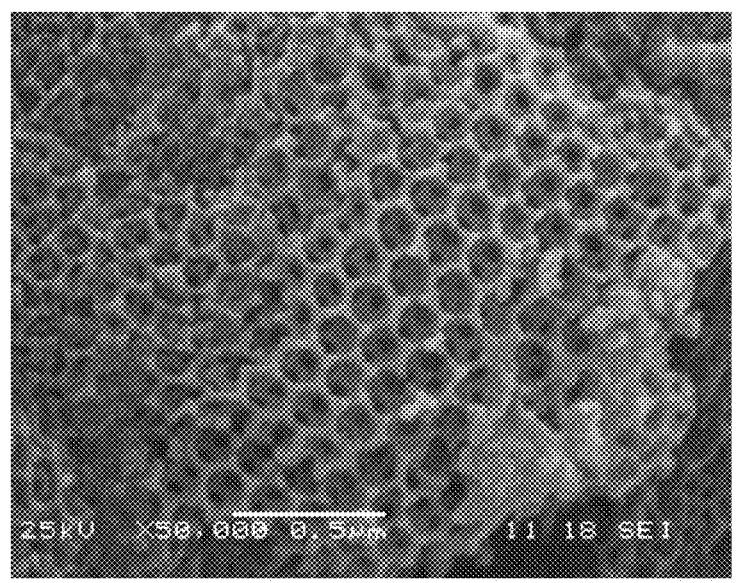
FIG. 5a is a scanning electron micrograph of the three-dimensional nanosized porous metal oxide electrode material $CoFe_2O_4$ of lithium ion battery prepared with the polystyrene colloidal crystal microsphere template shown in FIG. 4.

The ethylene glycol/methanol mixed solution with a total metal ion concentration of 1.5 mol·L-1 (the molar ratio, $Fe^{3+}$:$Co^{2+}$=2:1) as a precursor solution is poured into the gaps of the above-mentioned polystyrene colloidal crystal microsphere template, the three-dimensional nanosized porous $CoFe_2O_4$ is prepared after the incineration, which has a relative complete crystal form, and a three-dimensional porous network nanostructure (as shown in FIG. 5a), the diameter of a single aperture is approximately 130±10 nm;

the aperture wall is composed of $CoFe_2O_4$ crystal nanoparticles, and 20~30 nm in thickness.

Figure 5B:
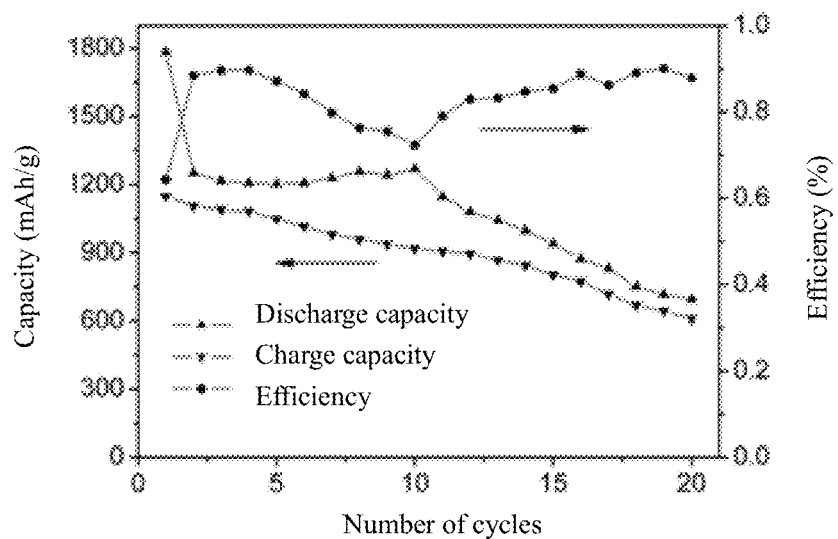

(3) Performance Test of a Three-Dimensional Nanosized Porous Metal Oxide Electrode Material $CoFe_2O_4$ of Lithium Ion Battery The electrochemical tests show that the initial discharge and charge capacities reach 1782 and 1147 $mAh·g^{-1}$, respectively, after 20 cycles, the reversible capacity is still as high as 610 $mAh·g^{-1}$, and the coulombic efficiency remains above 80%, presenting a relatively high specific capacity and a good cycle performance (as shown in FIG. 5b).

Embodiment 3

Preparation and Performance Test of a Three-Dimensional Nanosized Porous Metal Oxide Electrode Material $SnO_2$ of Lithium Ion Battery (1) Preparation of a Polystrene Colloidal Crystal Microsphere Template A 275±10 nm polystyrene microsphere emulsion is prepared by the emulsion polymerization method, the microspheres are arranged by the centrifugation method to be a polystyrene colloidal crystal microsphere template (as shown in FIG. 4), the scanning electron micrograph shows that the polystyrene colloidal crystal microsphere template presents a multilayer, orderly, regular, close arrangement in a large area, has fewer defects and a relatively strong sense of hierarchicy.

(2) Obtaining a Three-Dimensional Nanosized Porous Metal Oxide Electrode Material $SnO_2$ An ethanol solution of $SnCl_2.2H_2O$ with a total metal ion concentration of 0.5 mol/L is prepared as a precursor solution. The dried PS colloidal crystal template is soaked in the precursor solution for 10 hours, a complex of the precursor and the template is obtained after vacuum filtration; the precursor template complex is heated to 600° C. at 5° C./min and the temperature is kept for 10 hours, and then the three-dimensional nanosized porous metal oxide electrode material of lithium ion battery is obtained after cooling to room temperature.

Figure 6A:
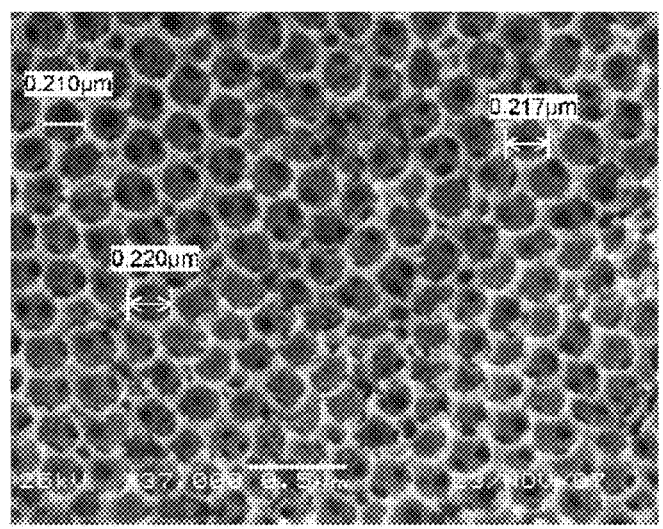
FIG. 6a is a scanning electron micrograph of the three-dimensional nanosized porous metal oxide electrode material $SnO_2$ of lithium ion battery prepared with the polystyrene colloidal crystal microsphere template shown in FIG. 4.

The ethanol solution of $SnCl_2.2H_2O$ with a total metal ion concentration of 0.5 mol/L as a precursor solution is poured into the gaps of the above-mentioned polystyrene colloidal crystal microsphere template, the three-dimensional nanosized porous $SnO_2$ is prepared after the incineration, which has a relative complete crystal form, and a three-dimensional porous network nanostructure (as shown in FIG. 6a), the diameter of a single aperture is approximately 215±10 nm; the aperture wall is composed of $SnO_2$ crystal nanoparticles, and 20~30 nm in thickness.

Figure 6B:
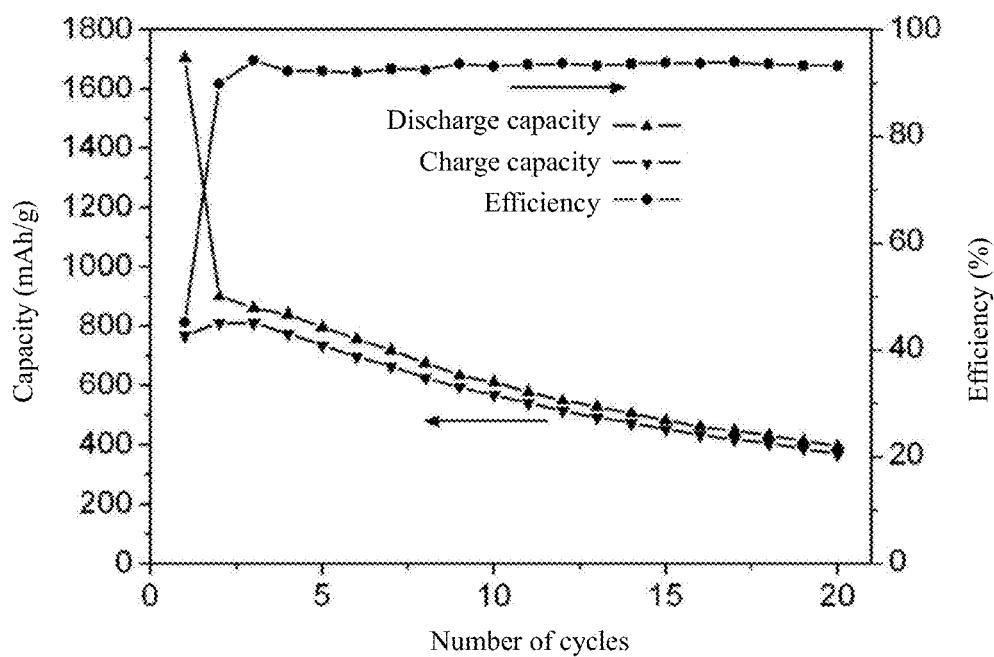

(3) Performance Test of a Three-Dimensional Nanosized Porous Metal Oxide Electrode Material $SnO_2$ of Lithium Ion Battery The electrochemical tests show that the initial discharge and charge capacities reach 1704 and 769 $mAh·g^{-1}$, respectively, after 20 cycles, the reversible capacity is still as high as 416 $mAh·g^{-1}$, and the coulombic efficiency remains above 90%, much higher than the theoretical capacity of graphite (as shown in FIG. 6b).

The present invention prepares a three-dimensional nanosized porous metal oxide electrode material of lithium ion battery with the template method, firstly a polymer microsphere emulsion is prepared with the polymer emulsion polymerization method, and then the polymer colloidal crystal microsphere template with regular arrangement is obtained by co-precipitation or centrifugation, then a metal salt solution as a precursor solution is poured into the gaps between the microspheres, and they are transformed into a metal complex or a solid metal compound before the template is removed; then a three-dimensional nanosized porous metal oxide electrode material with regular structure is obtained by removing the template with the method of incinerating at a low heating rate. The electrode material prepared has a good electrochemical performance. Such a method may also be used for the preparation of three-dimensional nanosized porous metal oxide electrode materials of other elements in other fields, which have a relatively uniform three-dimensional porous nanostructure, and a relatively wide application fields.

On the basis that the metal oxide electrode material has a high specific capacity, by the preparation of a porous nanostructure, the present invention improves the specific surface area and the ionic conductivity of the metal oxide electrode material greatly, and shortens the diffusion path of the lithium ions during an electrochemical reaction process, to make the electrode material react completely in the electrode reaction process, so as to further improve the specific capacity and the rate performance of the metal oxide electrode material, therefore the material is suitable for large-scale popularization.

That is to say, the present invention improves the ionic conductivity and the reactivity of the electrode material of lithium ion battery in the electrochemical reaction process by changing its micro morphology, so as to improve the characteristics of the material, such as the utilization rate, the rate performance and the specific capacity.

It is noted that, the precursor solution can be a salt solution of one metal, and can be a salt solution of many metals (e.g., Embodiment 2), if a salt solution of many metals is used as a precursor solution, the three-dimensional nanosized porous metal oxide electrode material of lithium ion battery obtained is essentially the three-dimensional nanosized porous multiple-metal-oxide electrode material of lithium ion battery.

To sum up, the three-dimensional nanosized porous metal oxide electrode material of lithium ion battery of the present invention improves the ionic conductivity of the negative electrode material of lithium ion battery, and shortens the diffusion path of the lithium ions during an electrochemical reaction process, improves the rate discharge performance of lithium ion battery greatly, and its preparation method is designed uniquely, operated simply and conveniently, and suitable for large-scale popularization.

In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

We claim:

1. A preparation method of a three-dimensional nanosized porous metal oxide electrode material for a lithium ion battery, wherein the method comprises the following steps:
(1) soaking a dried polymer microsphere colloid crystal template composed of microspheres with a size of 275±10 nm in a metal salt solution as a precursor, where the metal salt solution is selected from a group consisting of: an ethylene glycol/methanol mixed solution of $Fe^{3+}$, an ethylene glycol/methanol mixed solution of $Fe^{3+}$ and $Co^{2+}$ with a total metal ion concentration of 1.5 mols/Liter (the molar ratio, $Fe^{3+}$: $Co^{2+}$= 2:1), and an ethanol solution of $SnCl_2.2H_2O$ with a total metal ion concentration of 0.5 mol/L, where the soaking is conducted for 5-10 hours, and obtaining a polystyrene (PS) precursor template complex after filtration and drying; and (2) heating the polystyrene (PS) precursor template complex to a temperature that falls in a range of 450-600° C. at a rate of 1-5° C./min and keeping the temperature in the range of 450-600° C. for 10 hours, and then obtaining based on the selected precursor, respectively, from step 1—at least one of a-$Fe_2O_3$, $CoFe_2O_4$, or $SnO_2$ ordered three-dimensional nanosized porous metal oxide electrode material for the lithium ion battery after cooling to room temperature, wherein an aperture of the three-dimensional nanosized porous metal oxide electrode material has an aperture size of from 105 to 225 nm and an aperture wall thickness of from 20 to 30 nm and the least one of a-$Fe_2O_3$, $CoFe_2O_4$, or $SnO_2$ ordered three-dimensional nanosized porous metal oxide electrode material having an initial discharge capacity of at least 1704 mAh·$g^{-1}$ and a coulombic efficiency of at least 80% after 20 cycles.

2. The preparation method of a three-dimensional nanosized porous metal oxide electrode material for a lithium ion battery according to claim 1, wherein the polymer microsphere template is prepared by the following method: preparing a polymer microsphere emulsion with the polymer emulsion polymerization method, and then obtaining the polymer microsphere template with ordered arrangement by co-precipitation or centrifugation.

3. The preparation method of a three-dimensional nanosized porous metal oxide electrode material for a lithium ion battery according to claim 2, wherein the polymer microsphere emulsion is a polystyrene microsphere emulsion.

* * * * *